(12) United States Patent
Parsapour

(10) Patent No.: US 7,687,981 B2
(45) Date of Patent: Mar. 30, 2010

(54) METHOD FOR CONTROLLED DENSITY GROWTH OF CARBON NANOTUBES

(75) Inventor: Farzad Parsapour, Bartlett, TN (US)

(73) Assignee: Brother International Corporation, Bridgewater, NJ (US)

( * ) Notice: Subject to any disclaimer, the term of this patent is extended or adjusted under 35 U.S.C. 154(b) by 757 days.

(21) Appl. No.: 11/381,981

(22) Filed: May 5, 2006

(65) Prior Publication Data

US 2007/0259128 A1    Nov. 8, 2007

(51) Int. Cl.
*H01J 1/304* (2006.01)
*H01J 1/30* (2006.01)
*H01J 9/00* (2006.01)

(52) U.S. Cl. .................. 313/311; 313/309; 313/495; 445/24; 445/50; 445/51; 977/742; 977/842; 977/843; 977/939; 977/952

(58) Field of Classification Search ......... 313/495–497, 313/309–311; 445/24, 25, 49–51; 977/742, 977/939, 842, 843, 952

See application file for complete search history.

(56) References Cited

U.S. PATENT DOCUMENTS 6,656,339 B2    12/2003    Talin et al.

2003/0042834 A1*    3/2003    Dean et al. .................. 313/309

OTHER PUBLICATIONS

Choi et al., Fully Sealed, high-brightness carbon-nanotube field-emission display, Applied Physics Letters, vol. 75, No. 20, Nov. 1999.

Teo et al., Field emission from dense, sparse and pattered arrays of carbon nanofibers, Applied Physics Letters, vol. 80, No. 11, Mar. 2002.

Nilsson, et al., Scanning field emission from patterned carbon nanotube films, Applied Physics Letter, vol. 76, No. 15, Apr. 2000.

* cited by examiner

*Primary Examiner*—Mariceli Santiago
(74) *Attorney, Agent, or Firm*—Darby & Darby

(57) ABSTRACT

Described is a method for preparation of carbon nanotubes (CNTs) with medium to low-site density growth for use in field emission devices (FEDs). The method involves the deposition of a non-catalytic metal layer (interlayer), preferably a metallic conductor, onto the surface of a substrate, prior to the deposition of a catalytic layer (overlayer). The interlayer allows for only partial (sparse) growth of CNTs on the substrate, and helps to prevent resist layer "lift-off" when photolithographic processing is employed.

18 Claims, 5 Drawing Sheets

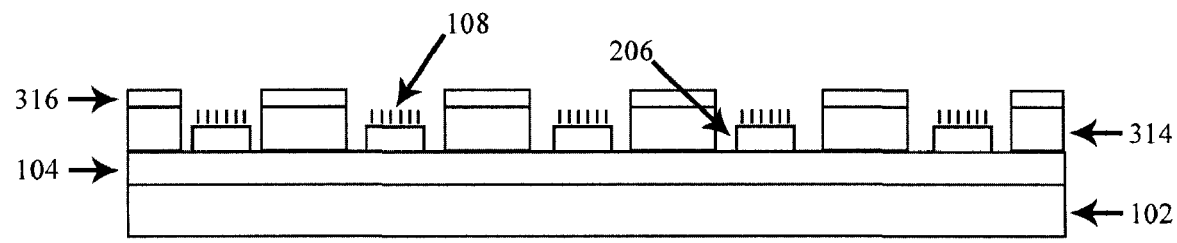
FIGURE 3
FIGURE 4
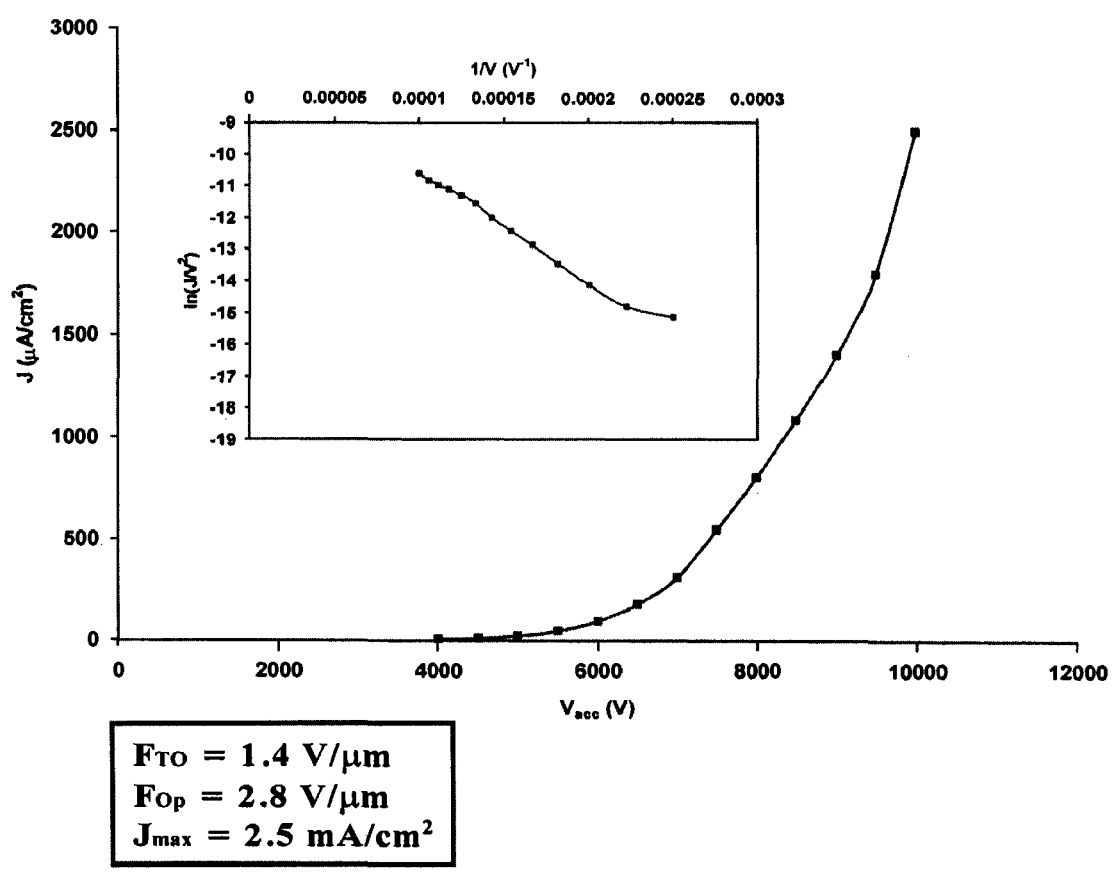
$F_{TO}$ = 1.4 V/μm
$F_{OP}$ = 2.8 V/μm
$J_{max}$ = 2.5 mA/cm$^2$ $F_{TO}$ = 1.7 V/μm
$F_{Op}$ = 2.7 V/μm
$J_{max}$ = 2.6 mA/cm$^2$ $F_{TO}$ = 1.7 V/μm
$F_{Op}$ = 2.7 V/μm
$J_{max}$ = 2.1 mA/cm$^2$

METHOD FOR CONTROLLED DENSITY GROWTH OF CARBON NANOTUBES

FIELD OF THE INVENTION

This invention relates to carbon nanotube arrays of medium to low-site density for use in field emission devices (FEDs), and methods of preparation thereof.

BACKGROUND OF THE INVENTION

Carbon nanotubes are hexagonal networks of carbon atoms forming seamless tubes with each end capped with half of a fullerene molecule. They were first reported in 1991 by Sumio Iijima who produced multi-layer concentric tubes or multi-walled carbon nanotubes by evaporating carbon in an arc discharge. Carbon nanotubes (CNTs) possess certain electronic and mechanical properties, making them candidates for applications relating to composite materials, nanoelectronics, sensors, and electron field emitters. CNTs can be utilized individually or as an ensemble to build a variety of devices. For instance, individual nanotubes have been used as tips for scanning probe microscopy and as mechanical nanotweezers. Ensembles of nanotubes have been used for field emission based flat-panel displays, and it has been suggested that bulk quantities of nanotubes may be used as a high-capacity hydrogen storage media. The electronic behavior of CNTs is closely related to their structure, i.e., tip curvature, radius and composition, nanotube length, and chirality. Thus, optimization of CNT structural elements may prove critical for electronic applications, including the development of field emission devices (FEDs).

FEDs are devices that capitalize on the cold emission of electrons. A typical field emission device includes at least a cathode, emitters, and an anode spaced from the cathode. A certain voltage applied between the cathode and the anode may cause electrons to be emitted from the emitters. The electrons travel in the direction from the cathode to the anode. These devices can be used in a variety of applications including, but not limited to, microwave vacuum tube devices, power amplifiers, ion guns, high energy accelerators, free electron lasers, and electron microscopes, and in particular, flat panel displays. Flat panel displays can be used as replacements for conventional cathode ray tubes. Thus, they have applications in television and computer monitors.

SUMMARY OF THE INVENTION

The method of the present invention for fabricating a plurality of carbon nanotube structures hereof comprises:

A method for fabricating a plurality of carbon nanotube structures having a low site-density growth, which method comprises:
  providing a substrate;
  forming a non-catalytic metal layer on the substrate;
  forming a catalytic metal layer on the non-catalytic metal layer; and
  forming the plurality of carbon nanotube structures on the substrate in the presence of the catalytic metal layer.

The present invention also provides methods for creating patterns of nanotube arrays on the surface of the substrate through the use of lithography. Well-defined patterns of low to medium-site density CNT arrays can be fabricated by employing the methods of the present invention, which methods further comprise:

depositing a layer of a resist material on one or more of the substrate, non-catalytic metal layer, and catalytic metal layer;
  patterning the resist layer; and
  removing a portion of the resist layer according to the pattern of the underlying substrate, non-catalytic metal layer, or catalytic metal layer.

The carbon nanotube arrays fabricated using the methods of the present invention comprise:
  a substrate;
  a non-catalytic interlayer disposed over at least a portion of the substrate;
  a plurality of pads disposed over at least a portion of the non-catalytic interlayer, a plurality of carbon nanotubes disposed on each pad with a density of no more than $10^{10}$ nanotubes/cm$^2$.

The carbon nanotube arrays made in accordance with the methods of present invention can be used in field emission devices (FEDs). The CNT arrays may also be employed in other mechanical and electronic applications including, but not limited to, the manufacture nanoelectronic sensors, switches, cold cathode ion gauges, and portable X-ray devices, wherein control of CNT-site density is required for improved performance.

The field emission devices fabricated using the methods of the present invention comprise
  a cathode;
  an anode;
  a carbon nanotube array disposed on the cathode, the carbon nanotube array comprising
    a non-catalytic interlayer disposed over at least a portion of the cathode;
    a plurality of pads disposed over at least a portion of the non-catalytic interlayer, a plurality of carbon nanotubes disposed on each pad with a density of no more than $10^{10}$ nanotubes/cm$^2$.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein:

FIG. 3 is a cross-sectional view of one embodiment of a cathode array for a field emission device.

FIG. 4 shows a plot of the current density vs. macroscopic electrical field and the Fowler-Nordheim plot (inset) for the CNT of Example X. The CNT array of Example X was 15×15 mm$^2$ in total area, comprising of a plurality of CNT pads, each 100×100 μm$^2$ in size and with a 250 μm pitch.

Figure 1A:
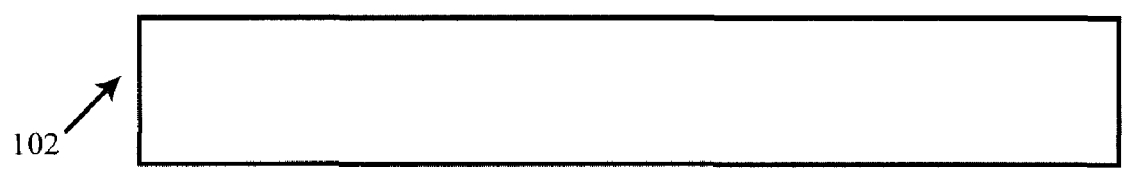
FIGS. 1A-1D illustrate steps in part of a first embodiment of a process for the formation of a carbon nanotube array with a plurality of CNT structures of low to medium-site density.
Figure 1B:
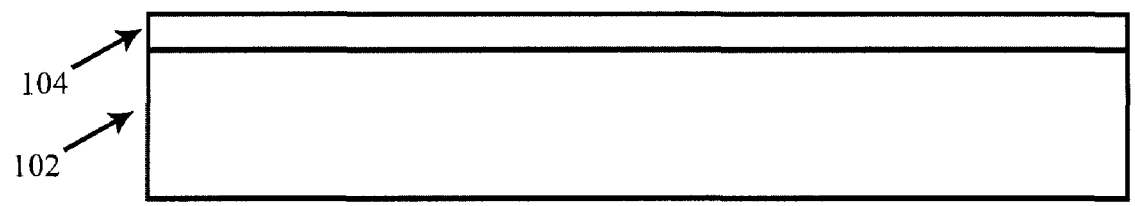
Figure 1C:
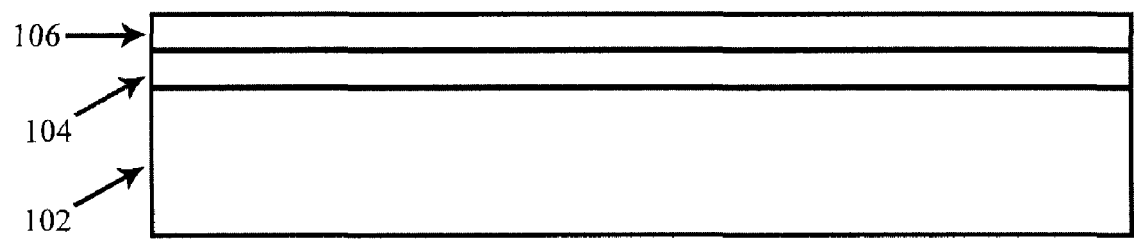
Figure 1D:
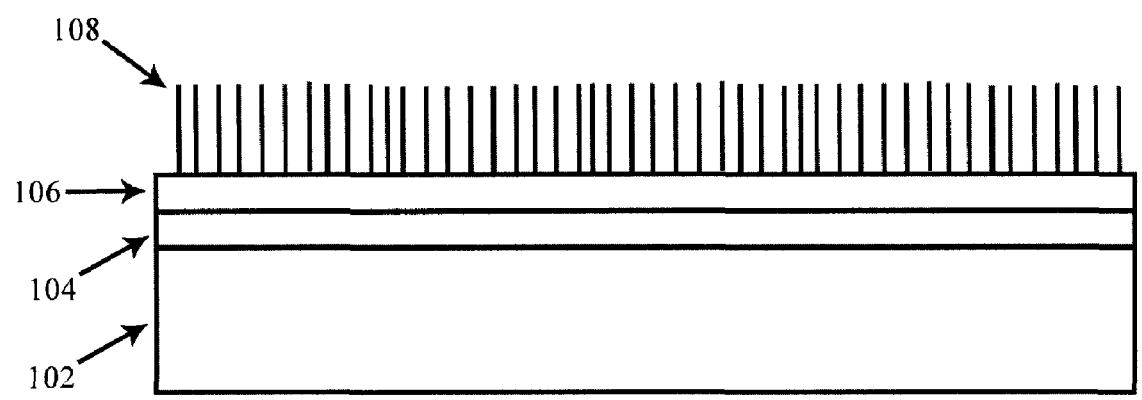
Figure 2A:
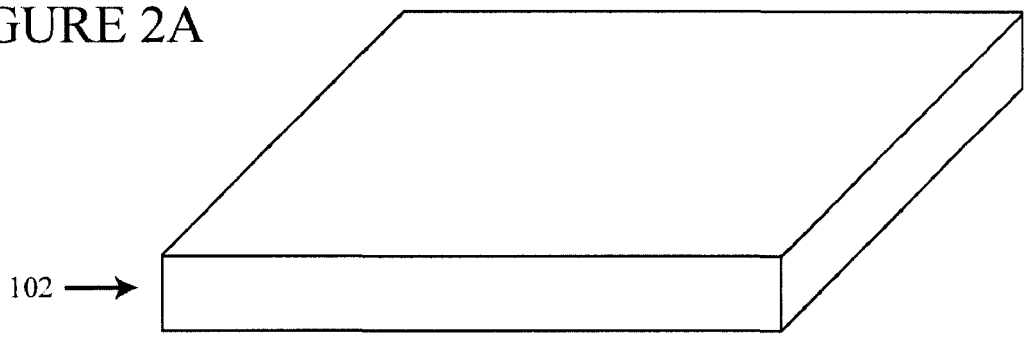
FIGS. 2A-2G illustrate steps in part of a second embodiment of a process for the formation of a carbon nanotube array with a plurality of CNT structures of low to medium-site density, wherein the array is further patterned with lithographic methods.
Figure 2B:
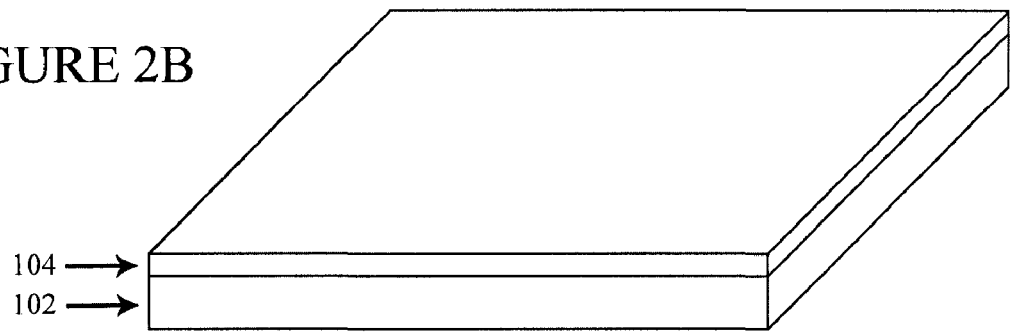
Figure 2C:
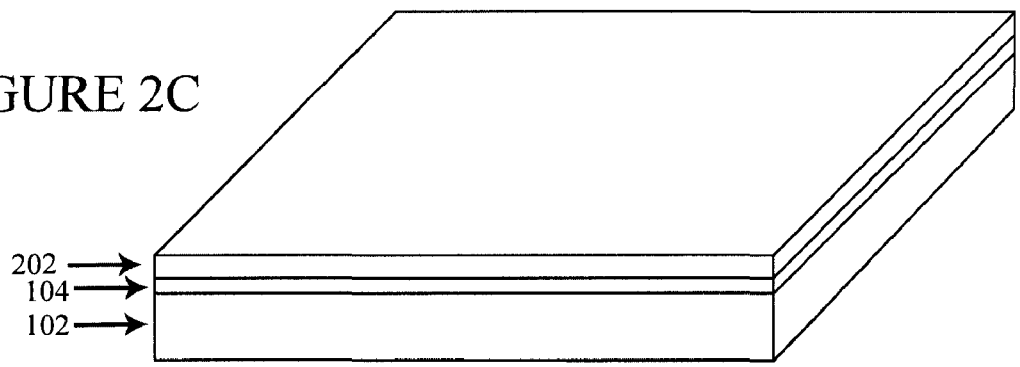
Figure 2D:
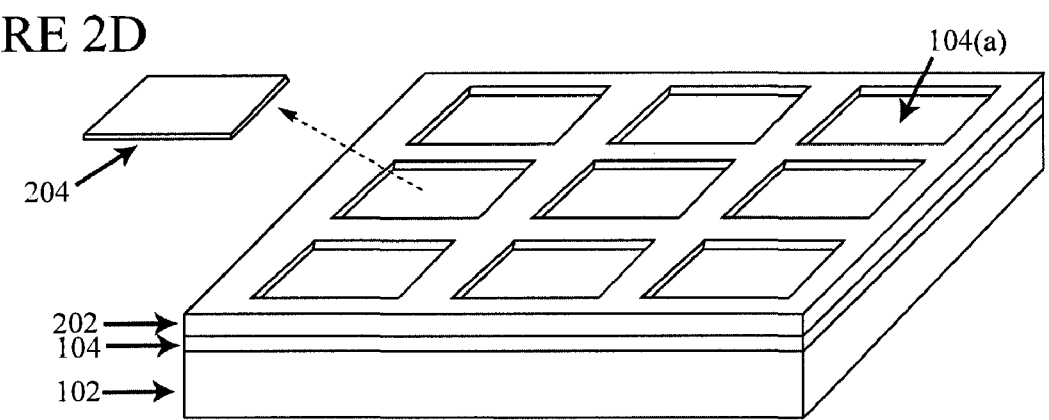
Figure 2E:
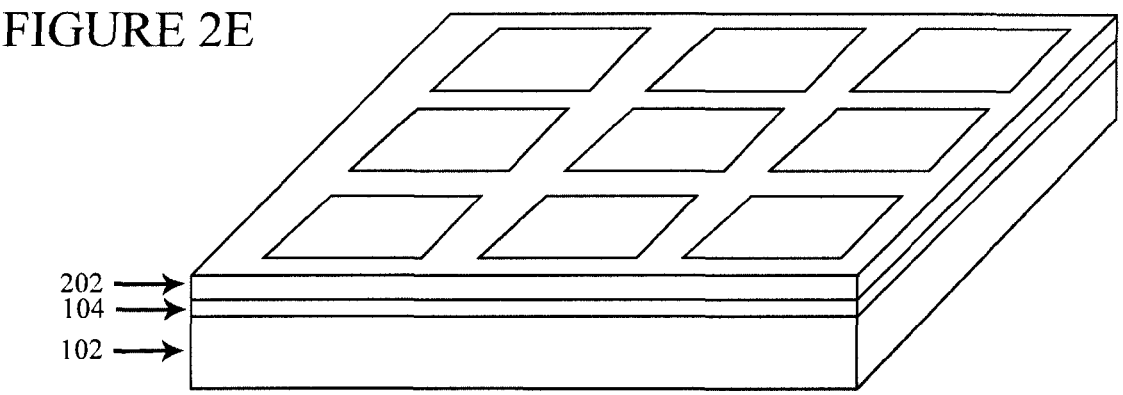
Figure 2F:
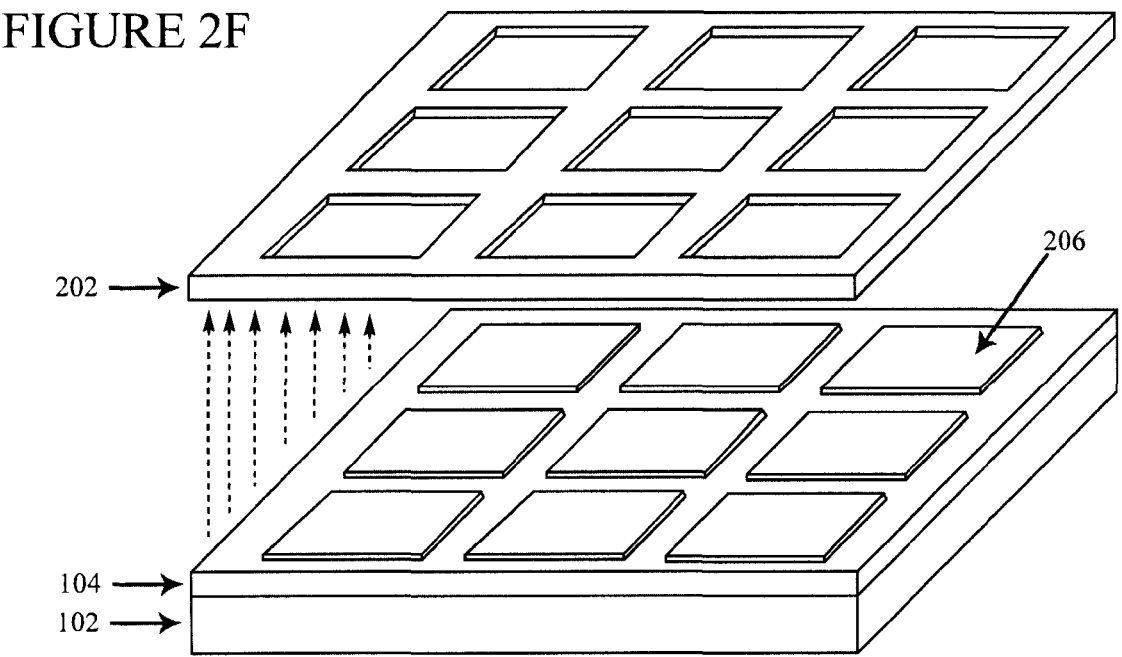
Figure 2G:
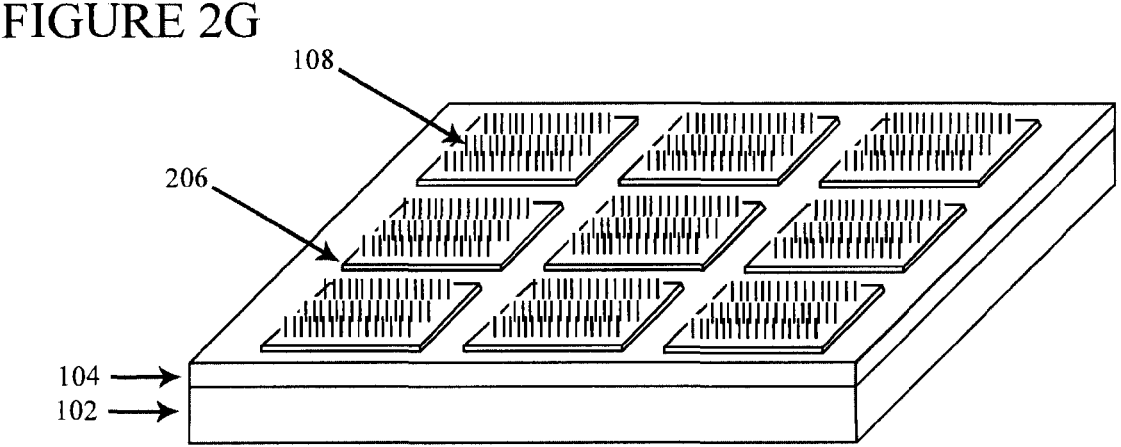
Figure 5:
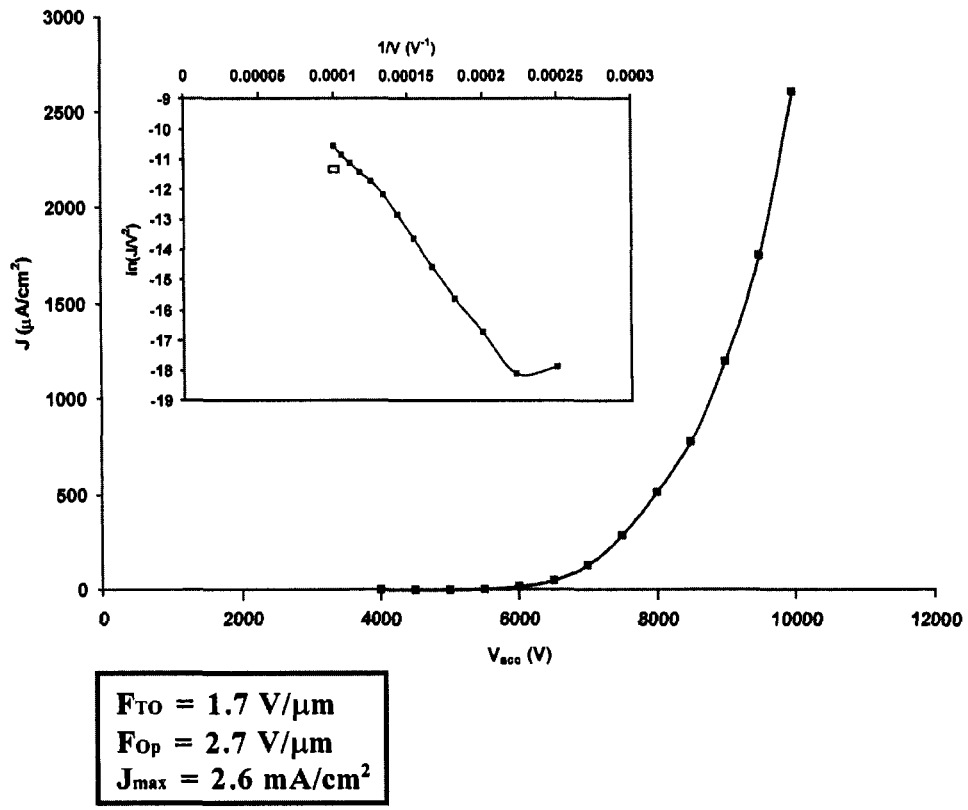
FIG. 5 shows a plot of the current density vs. macroscopic electrical field and the Fowler-Nordheim plot (inset) for the CNT of Example Y. The CNT array of Example Y was 15×15 mm² in total area, comprising of a plurality of CNT pads, each 10×10 µm² in size and with a 25 µm pitch.
Figure 6:
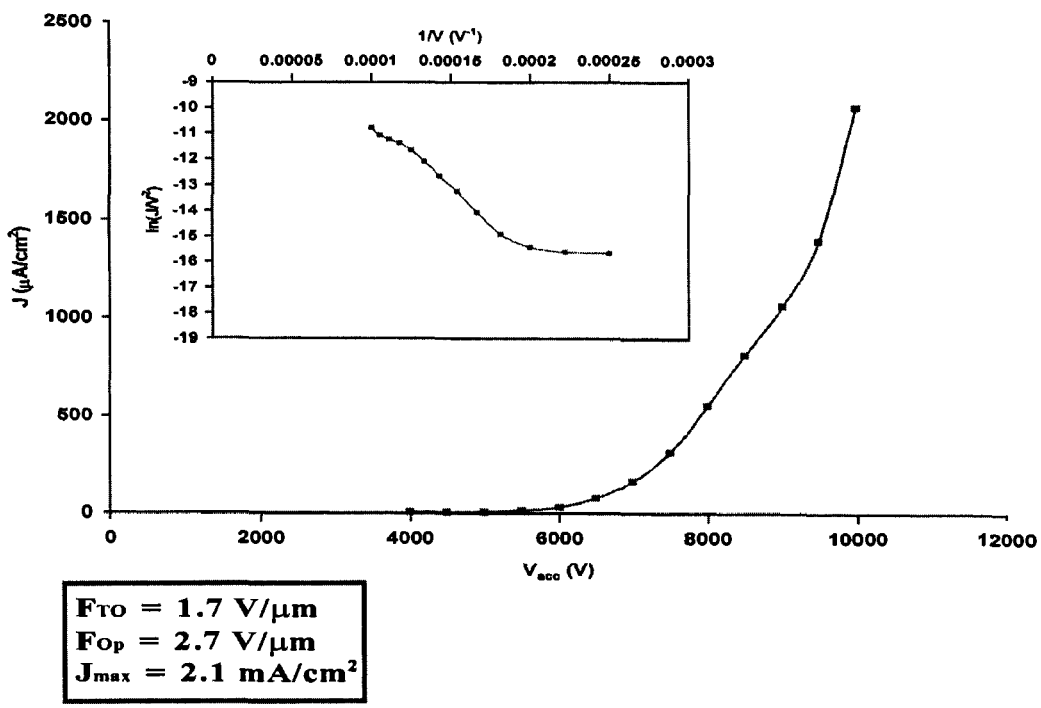

FIG. 6 shows a plot of the current density vs. macroscopic electrical field and the Fowler-Nordheim plot (inset) for the CNT of Example Z. The CNT array of Example Z was 15×15 mm² in total area, comprising of a plurality of circular CNT pads, each 2 µm in diameter and with a 12 µm pitch.

DETAILED DESCRIPTION OF THE INVENTION

Field emission is a quantum mechanical phenomenon and entails tunneling of electrons from a surface through a modified potential barrier to vacuum level in response to a large electrostatic field. Above a threshold value and below a saturation value, the emitted current is generally dependent on the local electric field, F, at the emitting surface and the work-function of the solid, $\phi$. This dependence is often qualitatively exhibited for a tip-shaped emitter through the Fowler-Nordheim relation. Although the relation strictly describes field emission from a planar surface at the zero (K) temperature limit, it may be utilized, cautiously, to describe field emission behavior for non-planar (e.g. tip) emitters.

For a planar metallic surface with a relatively low work function, appreciable tunneling current is observed typically at applied fields of 3000 V/µm or higher. For a tip-shaped emitter, the local electric field is greatly enhanced in the vicinity of the sharp protrusion, resulting in high current densities at much lower applied (external) fields. Therefore, tip-shaped structures, for example Spindt tips, have attracted much attention for applications in cold cathode emitters, especially field emission displays. Typically, a reduction in the tip radius of curvature results in an increase in the field enhancement factor.

Carbon nanotubes are excellent candidates for field emission due to their low work function and high aspect ratios (the length to radius ratio).

Although not wishing to be bound by any particular theory, an ensemble of high density, tightly packed nanotubes has been shown to possess reduced field enhancement, current densities and uniformity due to electrostatic field screening effect prompted by the proximity of nanotubes. Simulations of equipotential lines of the electrostatic field have suggested a preferable distance of 1L-2L between the nanotubes, where L is the nanotube length. This is thought theoretically to provide the highest field enhancement concurrent with sufficient nanotube emitter (number) density for optimal current density. In practice, any increase from 0L while maintaining an appropriate number density of nanotubes has been shown to result in improved field emission properties. Therefore, in accordance with one embodiment of the present invention is a method of producing a sparse forest of nanotubes with a statistical separation of the individual nanotubes, while maintaining an appropriate number of individual emitters.

Carbon nanotubes are typically produced by methods such as arc-discharge, laser ablation or chemical vapor deposition (CVD). The first two methods rely on evaporating carbon atoms from solid carbon sources at a very high temperature. The CVD process involves heating a catalyst material to a high temperature in a reactor and flowing a hydrocarbon gas through the reactor for a period of time. Several parameters in nanotube CVD growth include the hydrocarbon species in the gas, the catalyst, and the reaction temperature.

In one embodiment, the cathode plane for a cold-cathode field emission device (FED) includes a substrate having a top layer of a material that emits electrons when subjected to an external electric field. For at least some FED applications, it is desirable to directly grow the CNTs onto the cathode substrate. One example of a method of generating carbon nanotubes on a surface involves catalytic growth via chemical vapor deposition (CVD). A catalyst layer is evaporated or sputtered on a substrate, the substrate is loaded into a reaction chamber, and feed gas is introduced at elevated temperatures. Preferably, decomposition of the feed gas occurs only at the catalyst sites, thus reducing amorphous carbon generated in the process. Decomposed carbon molecules assemble into nanotubes at the catalyst nanoparticle sites. Advantageously, catalyst nanoparticles can be patterned on a substrate lithographically to realize nanotube growth at intentional locations. For example, the growth of nanotubes can be caused to originate at a site of electrical connections or of mechanical significance. This method results in formation of bundles of nanotubes with a high population (site) density.

Field emission properties of nanotubes, including the field enhancement factor and current density, are often dependent on the site density of the CNT deposit. These properties may suffer at high densities due to, for example, field screening effects. Techniques such as e-beam lithography and nanoimprint lithography have been employed for exact placement of individual nanotubes that are separated at pre-determined distances. However, these methods involve use of sophisticated equipment and are typically costly.

In accordance with the present invention, carbon nanotube (CNT) arrays of medium to low-site density for use in field emission devices (FEDs) are provided. In some embodiments of the present invention, the CNT arrays have superior physical properties, including increased field enhancement factors and current densities with enhanced emission site uniformity as compared to higher density CNT arrays. The enhanced physical properties of the nanotube arrays are provided by their novel methods of preparation in which CNT density is reduced by way of a non-catalytic intermediate layer (interlayer) deposited between the substrate and catalyst layer.

It has also been surprisingly found that, in some embodiments of the present invention, the deposition of a non-catalytic interlayer allows for a substantial increase in the adherence of the photoresist layer to the substrate.

In at least some embodiments, the site-density of the carbon nanotube array can be controlled, at least in part, by changing the thickness of the non-catalytic interlayer with regard to the thickness of the catalytic overlayer. In at least some embodiments, CNT height is controlled, at least in part, by the length of time that the substrate is allowed to react with the feed gases in the reaction chamber.

It has also been found that, in accordance with some embodiments of the present invention, CNT arrays can be fabricated without the need for a post-activation step after CNT growth. The post-activation step is not a requirement because the methods of the present invention do not utilize any organic compounds that must be removed from the CNT array after growth.

One embodiment of the present invention provides a method for the preparation of carbon nanotube (CNT) arrays. In at least some embodiment, the density of the CNTs can be controlled, at least in part, by separating the catalyst from the substrate with a non-catalytic metal interlayer. As shown in FIGS. 1A-D, the method involves the deposition of an interlayer (104), for example a chromium interlayer, onto a substrate (102); followed by the deposition of an outerlayer (106), for example an iron catalyst, onto the interlayer (104). In at least some instances, through the variation of the thickness of the interlayer and outerlayer metal films, CNTs (108) can be grown on the surface of the substrate with differing site-densities. The CNTs of the present invention are formed on the substrate at the catalyst sites using any suitable carbon nanotube formation technique including, but not limited to, chemical vapor deposition techniques.

The term "carbon nanotube" refers to a hollow cylindrical article composed primarily of carbon atoms For example, the nanotubes can have a narrow dimension (diameter) of about 1-200 nm and a long dimension (length), where the ratio of the long dimension to the narrow dimension, i.e., the aspect ratio, is at least 5. In many CNTs, the aspect ratio is between 50 and 2000. The carbon nanotubes of the invention can be either multi-walled nanotubes (MWNTs) or single-walled nanotubes (SWNTs). A MWNT, for example, includes several concentric nanotubes each having a different diameter. Thus, the smallest diameter tube is encapsulated by a larger diameter tube, which in turn, is encapsulated by another larger diameter nanotube. A SWNT, on the other hand, includes only one nanotube.

The term "substrate," as used herein, refers to the structure upon which the nanotube is disposed. In many instances, the substrate provides the mechanical support for the CNT. The substrate can be, for example, a single crystal, polycrystalline, glassy or amorphous material whose surface is the surface on which the nanotubes are deposited or grown. The substrate can comprise one or more layers that may be structured to form an electronic architecture. In particular, an architecture may be constructed which allows each CNT structure of an array of CNT structures to be separately addressable electrically. The substrate can also contain a pattern which is either uniform or non-uniform. The pattern may include contacts formed and leading to the CNT structures. That is, the substrate may include a plurality of current paths on the substrate, each coupled electrically to a respective one or more of the CNT structures. The substrate is not comprised of materials that are reactive with the nanotubes, with any material used in the process for their preparation or with intermediates formed during the process.

In a preferred embodiment of the present invention, the substrate is made of semiconductor material such as Si or n-doped silicon, or an insulating material such as silica, glass, alumina, quartz, ceramic materials, mica, a synthetic resin, or graphite. Especially preferred in the practice of the present invention is n-doped Si in the form of a Si wafer.

The term "non-catalytic metal," as used herein, refers to any metal or metal complex has negligible catalytic activity toward CNT growth when placed in the reaction chamber in the presence of the particular reaction gases and under the particular reaction conditions. Non-catalytic metals that are acceptable for the practice of the present invention include, for example, transition metals, transition metal complexes, or transition metal alloys that provide negligible catalytic activity at the substrate surface. The non-catalytic metal may provide for improved adherence of the photoresist to the substrate so as to prevent photoresist lift-off during, inter alia, lithographic techniques and resist etching.

In a preferred embodiment, the non-catalytic metal is selected from the group consisting of Cr, Al, Ga, In, Sn, Pb and complexes or alloys thereof. A particularly preferred non-catalytic metal for the practice of the present invention is metallic chromium.

The term "interlayer," as used herein, refers to a non-catalytic layer that is deposited on the surface of the substrate. The non-catalytic interlayer may be formed onto the surface of the substrate using any suitable technique including, but not limited to, chemical vapor deposition and physical vapor deposition methods known in the art including, but not limited to, e-beam evaporation and sputtering. In one embodiment, the non-catalytic interlayer is deposited on the substrate surface at a rate of from about 0.1 to about 0.5 nm/s, and has a thickness ranging from about 0.6 nm to about 2.0 nm.

The terms "catalyst," "catalytic metal," and "metal catalyst," as used herein, are synonymous, and refer to any material (e.g., a transition metal) that catalyzes the reaction of the carbon-containing feedstock to carbon nanotubes. Catalytic metals that are suitable for the practice of the method invention include, for example, any transition metal, transition metal complex, or transition metal alloy that, when exposed to the reaction chamber and feed gasses, aids in the formation of carbon nanotube structures on the substrate. The catalyst can be deposited on the surface of the non-catalytic interlayer in the form of the active catalyst or in the form of a pre-catalyst. The pre-catalyst is a metal containing material that when treated, for example, by exposure to the high temperatures of the reaction chamber, is converted to an active catalyst capable of promoting CNT growth on the substrate.

In a preferred embodiment of the present invention, the catalyst is a transition metal selected from the group consisting of Fe, Co, Ni, Mo, Pd, and Pt, and complexes and alloys thereof. A particularly preferred metal catalyst for the practice of the present invention is metallic Fe.

The term "overlayer," as used herein, refers to the catalyst layer that is deposited on the surface of the non-catalytic interlayer. The catalyst overlayer may be formed onto the surface of the interlayer using any suitable technique including, for example, chemical vapor deposition and physical vapor deposition methods known in the art including, but not limited to, e-beam evaporation and sputtering. In one embodiment, the catalyst overlayer is deposited on the interlayer surface at a rate of from about 0.1 to about 0.5 nm/s, and has a thickness preferably ranging from about 1.0 nm to about 5.5 nm.

It is also noted that the metal catalyst does not necessarily need to be deposited using physical vapor deposition techniques, although this is preferred. For example, catalyst materials can be deposited as metal salts dissolved in a carrier solvent. The solvent is then deposited on the interlayer and allowed to dry, leaving the metal salt. The metal salt may then need to be "activated" by exposing it to high temperature so that it decomposes into active catalyst material.

In a preferred embodiment, the interlayer is deposited on the surface of the substrate and the overlayer is deposited on the surface of the interlayer using an e-beam evaporator apparatus. In one embodiment, the thickness of the interlayer upon deposition using the e-beam evaporator is preferably from about 1.4 to about 1.8 nm. The thickness of the catalyst overlayer upon deposition using the e-beam evaporator is preferably from about 2.5 to about 2.9 nm.

The terms "ratio of thickness" or "thickness ratio," as used herein, are synonymous and refer to the ratio of thickness of the non-catalytic metal interlayer to the thickness of the catalytic overlayer. In at least some instances, the variation in thickness of the non-catalytic interlayer results in a variation in population density of CNT at constant catalytic layer thickness, with lower density for thicker non-catalytic layers. In these instances, by adjusting the thickness of the overlayer and interlayer and the thickness ratio, the site-density of the CNT arrays may be controlled. For example, the thickness ratio non-catalytic metal interlayer to the catalytic overlayer can be from about 1:1 to about 1:8, preferably from about 1:3 to about 2:3.

The term "reaction chamber," as used herein, refers to any apparatus that provides the reaction conditions for the growth of nanotube structures. In one embodiment of the present invention, the reaction chamber is a chemical vapor deposition (CVD) apparatus. In one example of a CVD process, gaseous mixtures of chemicals are dissociated at high temperature (for example, $CO_2$ into C and $O_2$) and some of the liberated molecules may then be deposited on a nearby substrate, with the rest pumped away. With regard to the growth of CNTs, the CVD apparatus provides an atmosphere of a source gas that provides the carbon atoms necessary for CNT growth. The CVD apparatus may also provide a promoter gas and a diluent gas to allow for an enhancement of the purity of the nanotubes grown. Examples of CVD methods include but not limited to thermal CVD, plasma enhanced CVD (PECVD), hot filament CVD (HFCVD), and synchrotron radiation CVD (SRCVD). In a preferred embodiment of the present invention the CVD apparatus is a thermal CVD apparatus.

A thermal CVD apparatus is typically heated to high temperature, e.g., from about 650 to about 1100° C., to allow for the thermal decomposition of a source gas. Examples of growing nanotubes are discussed below. It will be recognized, however, that there are many methods of making carbon nanotubes and these methods are, in general, suitable for use in the present invention. The source gas of the present invention can be, for example, a saturated or unsaturated; linear, branched, or cyclic hydrocarbon, or mixture of hydrocarbons, that are gas or vapor phase at the temperatures at which they are contacted with the catalyst substrate material (reaction temperature). Other exemplary carbon-containing gases include carbon monoxide, oxygenated hydrocarbons such as acetone and methanol, aromatic hydrocarbons such as toluene, benzene and naphthalene, and mixtures of the above. A rate of deposition of carbon on the catalyst material at elevated temperatures will depend on factors including the partial pressures of the carbon-containing gases. Preferred carbon source gases include methane, propane, acetylene, ethylene, benzene, or mixtures thereof. In an especially preferred embodiment, the carbon source gas for the synthesis of low to medium-site density CNTs is ethylene.

The promoter gas is a substance that is a gaseous compound at the reaction temperatures, and preferably comprises a non-carbon gas such as hydrogen, ammonia, ammonia-nitrogen, thiophene, or mixtures thereof. The promoter gas may be useful to reduce the formation unwanted allotropes of carbon, such as graphite, and the deposition of such materials on the substrate surface. The promoter gas of the present invention may be diluted by mixing it with a diluent gas, which are primarily unreactive, oxygen-free gases, such as for example, helium, nitrogen, argon, neon, krypton, xenon, hydrogen sulfide, or combinations thereof. For the CVD reaction process of the present invention, hydrogen is preferred for reaction temperatures maintained at less than about 720° C., while for higher temperatures (greater than or equal to about 720° C.), the promoter gas is chosen from ammonia, hydrogen, nitrogen, or any combination thereof. The promoter gas can be introduced into the reaction chamber (e.g. a thermal CVD apparatus) at any stage of the reaction process. Preferably, the promoter gas is introduced into the reaction chamber either prior to or simultaneously with the carbon source gas. In a preferred embodiment, the promoter gas is hydrogen and the diluent gas is argon.

The methods of the present invention can yield either multi-walled or single-walled nanotubes. For promoting multi-walled carbon nanotube growth, exemplary CVD methods employ a growth temperature typically in the range of 650-800° C. with ethylene as the carbon-containing gas. Carbon-containing gases for promoting the growth of single-walled carbon nanotubes include methane, ethylene, acetylene and carbon monoxide. SWNT are usually grown at a temperature in the range of 900-1100° C.

The methods of the present invention can provide carbon nanotube arrays wherein the growth of each individual nanotubes is either catalyzed from the base of the nanotube, or is catalyzed from the tip of the nanotube. If the mechanism of nanotube growth occurs from the base of the nanotube (catalysis at the catalyst overlayer surface), the nanotube structure will likely be attached to the surface of the catalyst overlayer. However, if the mechanism of nanotube growth occurs from the tip of the nanotube (catalysis distal from the catalyst overlayer surface), the nanotube structure will likely be attached to the surface of the substrate. Depending on nanotube catalysis factors such as, for example, the identity of the interlayer and/or overlayer (i.e., choice of metals), interlayer and over layer thickness, growth conditions (e.g., furnace temperature, reaction time), the nanotubes can be grown from the nanotube base, from the nanotube tip, or both. In certain embodiments of the present invention the CNT structures will be formed over the exposed surface of the catalytic metal layer. Although initial CNT formation occurs, in most cases, at the catalytic metal surface, the point of attachment of the CNT (catalyst surface or substrate surface) will depend on the mechanism or catalysis.

In a preferred embodiment of the present invention, a clean, virgin, n-doped, 2 side polished, Si wafer is loaded into an e-beam evaporator. Chromium (Cr), is evaporated onto the substrate at a rate of 0.1-0.5 nm/s, with a thickness ranging from about 1.4 nm to about 1.8 nm. Following the deposition of the Cr layer, an iron (Fe) catalyst layer is deposited over the Cr layer at a rate of 0.1-0.5 nm/s, with a thickness ranging from about 2.5 nm to about 2.9 nm. The wafer is cut into $15 \times 15$ $mm^2$ pieces and loaded into a thermal CVD furnace. Argon and an ethylene/hydrogen mixture in a ratio of approximately 1:1 are fed to the furnace at elevated temperatures ranging from about 680 and 720° C. The plurality of CNTs are then grown on the surface of the catalyst for a reaction time of from about 1 to about 60 minutes.

The reaction time in the preferred methods of the invention can be varied depending on the length of the nanotubes desired, with longer times generally resulting in longer nanotubes. For example, under one set of reaction conditions, reaction of the substrate in the thermal CVD furnace for 3 minute will provide CNT arrays wherein the individual nanotubes have an average length of about 2 μm. In one embodiment, the preferred reaction times utilized in the methods of the present invention are from about 3 to about 25 minutes to provide nanotubes with a length of from about 2 μm to about 10 μm.

Generally, the diameter and length of the carbon nanotubes will depend on the process parameters (e.g., temperature, time, ratio of gases, etc.) and gases used in growing the nanotubes. In addition, some nanotube formation techniques grow single-walled nanotubes and others techniques grow multi-walled nanotubes. In one example, multi-walled carbon nanotubes were grown at 700° C. for 25 minutes on a silicon substrate with iron catalyst layer. Different mixtures of gases were used including a mixture containing 100 sccm (standard cubic centimeters per minute) hydrogen and 690 sccm ethylene and a second mixture containing 400 sccm hydrogen, 400 sccm ethylene, and 400 sccm argon. The resulting carbon nanotubes had a range of heights from about 10 to 150 micrometers and a diameter in the range of 10 to 40 nm.

In a preferred embodiment, the average diameter of the CNTs in the arrays fabricated using the methods of the present invention is from about 10 nm to about 40 nm.

Thus, through the control of both the average height and average diameter of the CNTs grown from the methods described herein, arrays of CNTs can be fabricated with the large aspect ratios necessary for electronic applications such as, for example, field emission devices (FEDs).

In one embodiment of the present invention are the carbon nanotube arrays of low to medium-site density that are fabricated using the methods herein. The CNT arrays of the present invention have a site-density from about $10^6$ CNTs/$cm^{-2}$ to about $10^{10}$ CNTs/$cm^{-2}$, preferably from about $10^7$ CNTs/$cm^{-2}$ to about $10^9$ CNTs/$cm^{-2}$; a height of from about 2 to about 10 µm, preferably from about 3 to about 5 µm; and an aspect ratio of from about 50 to about 1000, preferably from about 300 to about 500.

As referred to herein "density" or "site-density" denotes units of CNT structures per centimeter squared (CNTs/$cm^{-2}$). Site density relates the statistical spacing distance between individual CNT structures in an array. For example, a density of about $10^8$ CNTs/$cm^{-2}$ corresponds to a statistical spacing distance between CNTs of about 1 micrometer (µm). CNT site density can be estimated, for example, by manual counting of CNTs in SEM images.

The term "high site-density," as used herein, refers to a large number of CNT structures per centimeter squared (CNTs/$cm^{-2}$). Typically a high site-density refers to a density of more than $10^{10}$ CNTs/$cm^{-2}$.

The term "medium site-density," as used herein, refers to an intermediate number of CNT structures per centimeter squared (CNTs/$cm^{-2}$). Typically a medium site-density refers to a density from about $10^{10}$ CNTs/$cm^{-2}$ to about $10^8$ CNTs/$cm^{-2}$ The term "low site-density," as used herein, refers to a small number of CNT structures per centimeter squared (CNTs/$cm^{-2}$). Typically a low site-density refers to a density less than about $10^8$ CNTs/$cm^{-2}$.

The terms "array" and "CNT array," as used herein, are synonymous and refer to a plurality of CNT tubules that are attached to the substrate material proximally to one another. For the purposes of the various embodiments of this invention, the CNT array comprises the substrate, the interlayer material, the outerlayer catalyst material, and the plurality of CNT structures grown thereon. The CNT array of the present invention can be used as a cold cathode in the fabrication of field emission devices and particularly for field emission displays.

In a further embodiment of the present invention lies a method for forming patterns of CNTs on the substrate using lithographic methods. The lithographic methods described herein provide for the precise placement and patterning of catalytic sites onto the surface of the substrate. Thus, the CNT arrays fabricated using the methods herein can be grown in alignment with, inter alia, current paths on the substrate.

The terms "resist" and "resist material," as used herein, are to be understood to encompass any material suitable to protect an underlying surface during a process treatment. Thus, a resist may be any organic or inorganic chemical substance or compound which can be blanket-deposited and patterned for feature definition. Both positive and negative resists can be used. The resist can have process selectivity relative to the underlying material, such as significantly differing etch-rates, or it may act as a shielding element, for instance, to protect the underlying surface from material deposition or ion bombardment. In one embodiment, resist development produces a negative pattern of pads with pre-determined dimensions. These pads can then, for example, be used to control the areas of catalyst deposition on the interlayer to ultimately control defined areas on the substrate where CNT growth is initiated.

In one embodiment of the present invention, the resist material is a photoresist material suitable for use with any photolithography method. Photolithography can include masking techniques and other techniques, such as mirrored laser illumination. As one example, a photoresist material is a viscous polymer resin (solution) containing some photochemically active polymer (PAC), which is typically rendered insoluble or soluble, relative to a wash solution, by exposure to light. Using a photoresist, a selected pattern can be imaged on a substrate. Areas of a negative photoresist not exposed to electromagnetic radiation may be removed by a washing process. Alternatively, a positive photoresist method may be employed, wherein only the areas of the photoresist material that have been exposed to electromagnetic radiation are removed by washing. As examples, a liquid resist such as is used in semiconductor manufacture or a film resist such is used in the manufacture of printed circuit boards may be used for this purpose.

FIGS. 2A-2G illustrate a portion of one embodiment of a process to form a patterned array of a plurality of CNT structures using lithography. First, the metal interlayer 104 is formed on the substrate 102. Second, a resist layer 202 is formed on the exposed surface of the interlayer and the resist layer is patterned using, for example, a mask and exposing the resist layer to, for example, a UV light source. The resist layer 202 is treated to remove, for example, the exposed portions of the resist layer 204. Next, a catalytic outerlayer is formed on exposed surfaces 104(a) of the non-catalytic interlayer 104 to form plurality of catalytic outerlayer pads 206. The remaining resist layer 202 is then removed and the catalyst/substrate material is treated to form a plurality of CNT structures 108 onto the surface of the plurality of catalytic outerlayer pads 206. Alternatively, the plurality of CNT structures 108 can be formed on the plurality of outerlayer pads 206 prior to the removal of the remaining resist layer 202.

In an alternative embodiment, the resist material is deposited on the surface of the substrate prior to the deposition of the interlayer onto the surface of the substrate. The resist layer is aligned with a mask with an appropriate pattern and the exposed areas of the resist layer are treated with, for example, a UV light source. The resist layer is then developed and the exposed areas removed to provide a pattern of negative pads with pre-determined dimensions, where the substrate surface is exposed. The non-catalytic metal layer and catalyst layer are then deposited on the exposed substrate surface. Finally, the remaining resist layer is removed through etching. The final product has interlayer/outerlayer pads over a uniform and continuous substrate surface.

The field emission current of the CNT arrays are, for example, measured by using a simple diode configuration. The anode can be, for example, a molybdenum disk with a diameter of about 5 mm and the gap between the CNT array and the anode is about 3 mm. In a preferred embodiment, the anode consists of an ITO-coated glass slide having a CRT phosphor coating. The phosphor coating provides the advantage of direct observation of field emission from nanotubes and enables one to differentiate between field emission and other phenomena such as, for example, edge emission. This differentiation can be important for accurate measurement of field emission current density at varying applied fields.

In another embodiment lies a method for the manufacture of a field emission device (FED) comprising a CNT-based cold cathode fabricated using the methods of the present invention. Examples of FEDs include a diode-based architecture consisting of a cathode and an anode; a triode based architecture consisting of a cathode, and anode, and a gate electrode; or a tetrode based architecture further comprising an electrode between the gate electrode and the anode to be used as a focusing grid. The FED can be fabricated using methods and materials known in the art, for example those disclosed in "Materials for Field Emission Displays" (Burden, A. P. *International Material Reviews* 46:213-231 (2001)) which is incorporated herein by reference in its entirety.

In a preferred embodiment, the CNT-based array (i.e., substrate, interlayer, outerlayer, and the plurality of CNT structures grown thereon) is the cold cathode for an FED with triode based architecture. One method of manufacture of a triode FED comprising the cold cathode of the present invention comprises:

(1) assembling a CNT cold cathode array, wherein the cold cathode array comprises a substrate with a surface, an interlayer, an catalytic outerlayer, and a plurality of nanotubes grown on the surface of the outer layer;

(2) depositing an insulating material with a plurality of openings onto the surface of the array; wherein
  (a) the openings are aligned with a plurality of CNT structures within the array;

(3) depositing a gate electrode onto the surface of the insulator; and (4) aligning the cathode array with an anode, the anode comprising a faceplate with a phosphor coating.

FIG. 3 illustrates a portion of one embodiment for the cathode array of a field emission device manufactured using certain cold cathode arrays of the invention. The cathode array comprises 1) a cold cathode array, comprising a substrate 102, a non-catalytic interlayer 104, a plurality of catalytic outerlayer pads 206, and a plurality of CNT structures 108; 2) optionally, an insulator layer 314 on the exposed surface of the interlayer 104; and 3) optionally, a gate electrode layer 316 on the exposed surface of the insulator layer 314.

The cathode array of FIG. 3, can then be coupled with an anode using conventional methods in the art as, for example, disclosed in "Materials for Field Emission Displays" (Burden, A. P. *International Material Reviews* 46:213-231 (2001)).

For the manufacture of field emission devices and displays, it is fairly standard practice to use methods, for example photolithography methods, for forming patterns of the metal cathode, interlayer, and outerlayer. Thus, utilizing the lithography methods set forth herein for the manufacture of FEDs is well within the scope of the embodiments of the present invention.

Without further elaboration, it is believed that one skilled in the art can, using the preceding description, utilize the present invention to its fullest extent. The following examples are, therefore, to be construed as merely illustrative, and not limitative of the remainder of the disclosure in any way whatsoever.

EXAMPLES

Example 1

Nanotube Growth Using Thermal CVD Furnace

A clean, virgin, n-doped, 2 side polished, Si wafer was loaded into an e-beam evaporator. A non-catalytic metal, chromium (Cr), was evaporated onto the substrate at a rate of 0.1 nm/s, with a thickness of about 1.6 nm. Following the deposition of the non-catalyst, a catalyst layer, iron (Fe), was deposited over the non-catalytic layer at a rate of 0.1 nm/s, with a thickness of about 2.7 nm. The wafer was cut into 15×15 mm$^2$ pieces and loaded into a thermal CVD furnace. Carrier and promoter gases, argon and hydrogen, were fed to the furnace at 500 sccm and 500 sccm, respectively, for 5 minutes at room temperature. The carrier gas was shut off and the promoter gas was reduced to 100 sccm and the thermal ramp was initiated. Chamber temperature was ramped to 700° C. within 11 minutes, and the sample was annealed for an additional 15 minutes at 700° C. under hydrogen flow of 200 sccm. Following the annealing step, promoter and feed gases, hydrogen and ethylene, were introduced to the chamber at flow rates of 400 and 400 sccm, respectively. The reaction was carried out for 15 minutes, following which, the chamber was allowed to cool down to ~250° C. under Ar flow of 500 sccm. After the cool down step, samples were removed from the chamber and immediately analyzed via SEM. A site density of ~5 nanotubes/μm and nanotube length of ~3-5 μm was observed. Utilizing the exact same CVD reaction conditions for a sample with Cr layer thickness of 1.7 nm and Fe layer thickness of 1.7 nm resulted in tube site density of ~0.3 nanotubes/μm and tube length of ~1-3 μm. Also, using the exact same CVD reaction conditions for a sample with Cr layer thickness of 0 nm and Fe layer thickness of 1.5 nm resulted in tube site density of 25 nanotubes/μm and tube length of ~5-10 μm.

Example 2

Photolithography Method

A clean, virgin, n-doped, 2 side polished, Si wafer was loaded into an e-beam evaporator. A non-catalytic metal, chromium (Cr), was evaporated onto the substrate at a rate of 0.1 nm/s, with a thickness of about 1.6 nm. Following Cr deposition, the wafer was placed in a spin coater and 5 ml of a positive photoresist, for example, PR1-1000A available from Futurrex, Inc., Santa Clara, Calif., was applied at rest. The wafer was spun at 3000 RPM for 30 seconds, followed by 700 RPM for 3 minutes. After spin coating, the wafer was dried in an oven at 100° C. for 10 minutes. The spun-coated wafer was exposed through a photomask having a plurality of arrayed patterns (for example, 15×15 mm$^2$ in total area, comprising of a plurality of squares, each 100×100 μm$^2$ in size and with a 250 μm pitch) to UV light (250 mJ exposure energy), followed by 40 seconds of developing in a resist developing solution, for example, RD6 available from Futurrex, Inc., Santa Clara, Calif. This resulted in formation of the image of the photomask onto the photoresist. After through rinsing with 18 ohm-cm deionized water and drying, the wafer was placed back in the e-beam evaporator and a catalyst layer, iron (Fe), was deposited at a rate of 0.1 nm/s, with a thickness of preferably 2.7 nm. The wafer was removed from the evaporator and placed in a photoresist remover bath, for example, RR4 available from Futurrex, Inc., Santa Clara, Calif., for 3 minutes. After thorough rinsing with 18 ohm-cm deionized water and drying, the now fully patterned wafer was cut into square pieces and placed in the CVD reactor for CNT growth following conditions of Example 1.

Example 3

Testing of Field Emission

CNT field emitters grown on conductive Si substrates (the cathode) according to examples 1 and 2 above, were characterized for their field emission properties. The field emission apparatus was a diode device consisting of the cathode, glass spacers, and a phosphor/ITO-coated glass slide acting as the anode. The cathode was secured onto a vacuum-compatible platform and separated from the anode using glass slides with a thickness of 3.3 mm. P-22 green, blue, and red phosphors available from USR Optonix, Hackettstown, N.J. were settled onto the ITO-coated glass slide from an aqueous suspension with binder, dried, and trimmed to a 20 mm×20 mm area. Screen density of phosphor screens stood at 1-3 mg/cm². The purpose of using a phosphor screen as the anode was to verify field emission from the nanotubes as opposed to for example, edge emission, and also to provide a tool for checking emission uniformity. The glass slide was attached to a support structure and secured to the spacers resting on the cathode platform. The anode was biased at high voltage (1-10 kV) and the cathode was grounded. The apparatus was set in a vacuum chamber equipped with a turbo-molecular pump and the chamber was pumped down to $3\text{-}5\times10^{-7}$ torr. Emission current was monitored and recorded using an electrometer while varying the anode voltage. CNT field emission and emission uniformity was observed through a leaded-glass viewport on the chamber.

Examples 5-9

Formation and Field Emission Properties of Patterned Arrays

Arrays of catalytic pads (Table 1, Examples 5-9) were formed over a planar layer of non-catalyst on Si substrates according to the method of Example 2, and carbon nanotubes were grown on these arrays according to the method of Example 1. All samples were produced under identical conditions of Examples 1 and 2. Cr layer thickness was ~1.1 nm and Fe layer thickness stood at 2.7 nm. Samples were characterized for nanotube site density and length utilizing scanning electron microscopy. Nanotube length stood at ~5 μm and site density was ~10 nanotubes/μm. Samples were also characterized for field emission properties according to the method of Example 3, including turn-on field ($F_{TO}$), defined as the field required to produce 10 μA/cm² of field emission, operating field, defined as the field required to produce 1 mA/cm² of field emission, F-N slope, and maximum current density attained for the sample at an applied field of 3 V/μm ($J_{max}$). Table 1 exhibits the results obtained for several samples of varying array and pad geometry. As one may observe, the methods of this invention have resulted in low turn-on fields and high current densities which are important to applications in field emission devices.

TABLE 1

Field Emission Properties of Patterned Array Examples 5-9

| Pattern (pad size/pitch/pattern size) (μm/μm/μm²) | $F_{TO}$ (V/μm)* | $F_{Op}$ (V/μm)** | F-N Slope (low field) | $J_{max}$ (mA/cm²) |
|---|---|---|---|---|
| Example 5 (100/250/15000) | 1.4 | 2.8 | −37500 | 2.5 |
| Example 6 (10/25/15000) | 1.7 | 2.7 | −69600 | 2.6 |
| Example 7 (10/25/15000) | 1.8 | 2.6 | −76200 | 2.2 |
| Example 8 (10/50/15000) | 1.9 | 2.7 | −75100 | 2.6 |
| Example 9 (2/12/15000) | 1.7 | 2.7 | −57600 | 2.1 |

Patents, patent applications, publications, product descriptions, and protocols which are cited throughout this application are incorporated herein by reference in their entireties for all purposes.

The present invention is not limited in scope by the specific embodiments described herein. Indeed, various modifications of the invention in addition to those described herein will become apparent to those skilled in the art from the foregoing description. Such modifications are intended to fall within the scope of the appended claims. It is further to be understood that all values given in the foregoing examples are approximate, and are provided for purposes of illustration.

What is claimed is:

1. A method for fabricating a carbon nanotube array having a low site-density growth, which method comprises:
   providing a substrate;
   forming a non-catalytic metal interlayer on the substrate, the non-catalytic metal interlayer having a thickness of from about 0.6 nm to about 2.0 nm;
   forming a catalytic metal overlayer on the non-catalytic metal interlayer, the catalytic metal overlayer having a thickness of from about 1.0 nm to about 5.5 nm and defined by a plurality of separate pads disposed on the surface of at least a portion of the non-catalytic metal interlayer; and
   forming the plurality of carbon nanotube structures on the substrate in the presence of the catalytic metal overlayer, the carbon nanotube structures having a density of no more than $10^{10}$ nanotubes/cm².

2. The method of claim 1, wherein forming the plurality of carbon nanotube structures comprises forming a plurality of carbon nanotubes on each of the separate pads.

3. The method of claim 1, wherein the non-catalytic metal interlayer comprises a non-catalytic metal selected from the group consisting of chromium, aluminum gallium, indium, tin, and lead.

4. The method of claim 3, wherein the catalytic metal is chromium.

5. The method of claim 1, wherein the catalytic metal overlayer comprises a catalytic metal selected from the group consisting of iron, cobalt, nickel, molybdenum, palladium, and platinum.

6. The method of claim 5, wherein the catalytic metal is iron.

7. The method of claim 1, wherein forming the non-catalytic metal interlayer comprises forming the non-catalytic metal interlayer using a physical vapor deposition (PVD) process.

8. The method of claim 1, wherein forming the catalytic metal overlayer comprises forming the catalytic metal overlayer using a physical vapor deposition (PVD) process.

9. The method of claim 1, wherein forming the non-catalytic metal interlayer and forming the catalytic metal overlayer comprises forming the non-catalytic metal interlayer and the catalytic metal overlayer wherein a ratio of a thickness of the non-catalytic metal interlayer to a thickness of the catalytic metal overlayer is in the range of about 1:1 to about 1:8.

10. The method of claim 9, wherein the ratio of thickness is from about 1:3 to about 2:3.

11. The method of claim 1, wherein the density of carbon nanotube structures is not more than $10^8$ nanotubes/cm².

12. The method of claim 1, which method further comprises:
   depositing a layer of a resist material on one or more of the substrate, non-catalytic metal interlayer, and catalytic metal overlayer;
   patterning the resist layer; and
   removing a portion of the resist layer according to the pattern of the underlying substrate, non-catalytic metal interlayer, or catalytic metal overlayer.

13. A carbon nanotube array, comprising:
   a substrate;

a non-catalytic metal interlayer disposed over at least a portion of the substrate; and a plurality of catalytic metal overlayer pads disposed on the surface of at least a portion of the non-catalytic interlayer, a plurality of carbon nanotubes disposed on each pad with a density of no more than $10^{10}$ nanotubes/cm$^2$; wherein the non-catalytic metal interlayer has a thickness of from about 0.6 nm to about 2.0 nm, and wherein the catalytic metal overlayer pads have a thickness of from about 1.0 nm to about 5.5 nm.

14. The carbon nanotube array of claim 13, wherein the density of carbon nanotubes on each pad is no more than $10^8$ nanotubes/cm$^2$.

15. The carbon nanotube array of claim 13, wherein the pads are arranged in a regular array.

16. A field emission display, comprising:
a cathode;
an anode;
a carbon nanotube array disposed on the cathode, the carbon nanotube array comprising
a non-catalytic metal interlayer disposed over at least a portion of the cathode; and
a plurality of catalytic metal overlayer pads disposed on the surface of at least a portion of the non-catalytic interlayer, a plurality of carbon nanotubes disposed on each pad with a density of no more than $10^{10}$ nanotubes/cm$^2$; wherein the non-catalytic interlayer has a thickness of from about 0.6 nm to about 2.0 nm, and wherein the catalytic metal overlayer pads have a thickness of from about 1.0 nm to about 5.5 nm.

17. The field emission display of claim 16, wherein the density of carbon nanotubes on each pad is no more than $10^8$ nanotubes/cm$^2$.

18. The field emission display of claim 16, wherein the plurality of pads are individually addressable.

* * * * *